United States Patent Office 3,725,125
Patented Apr. 3, 1973

3,725,125
FABRICS SIZED WITH COPOLYMERS OF SULFUR DIOXIDE AND ALLYL EPOXYALKANE ETHERS
William Ross Moore and Ralph Rolland Langner, Lake Jackson, Tex., assignors to The Dow Chemical Company, Midland, Mich.
No Drawing. Original application Nov. 4, 1970, Ser. No. 86,940. Divided and this application July 22, 1971, Ser. No. 165,327
Int. Cl. C08j 1/44
U.S. Cl. 117—139.5 A       3 Claims

ABSTRACT OF THE DISCLOSURE

Natural and synthetic fabrics are sized with copolymers of sulfur dioxide and compounds of the formula

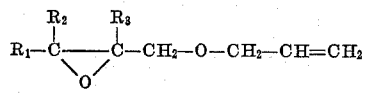

wherein $R_1$, $R_2$ and $R_3$ are independently hydrogen or methyl groups.

CROSS REFERENCES

This application is a division of application Ser. No. 86,940, filed Nov. 4, 1970, now Pat. 3,657,200.

BACKGROUND OF THE INVENTION

This invention relates to the eqiumolar addition copolymer of sulfur dioxide and allyl epoxy alkane ethers as well as fabrics sized therewith.

It is known from the article by W. Solonina, J. Russian Phy. Chem. Soc. 30:826 (1898), that sulfur dioxide can be copolymerized with allyl ethyl ether. However, the present invention provides a related copolymer having reactive epoxy groups which react with natural or synthetic fabrics such as those derived from animal, vegetable or polymeric fibers to provide a permanent size thereon.

SUMMARY OF THE INVENTION

It now has been found that a solid copolymer can be produced from the reaction of molar quantities of sulfur dioxide and allyl epoxyalkane ethers. The copolymers are prepared by the reaction of the monomers in an inert solvent in the presence of a catalyst. The copolymers can be used to size fabrics by forming the copolymer in situ on or in the fabrics, or by dissolving a small but effective amount of copolymers in hot water at a pH of about 6-8, saturating the fabrics therewith and subsequently drying the article.

The invention thus comprises equimolar copolymers of sulfur dioxide with compounds of the formula

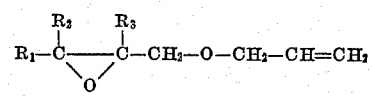

where $R_1$, $R_2$, and $R_3$ are independently hydrogen or methyl groups as well as articles prepared therefrom by applying an effective sizing amount of the copolymers to a natural or synthetic fiber.

DETAILED DESCRIPTION

The copolymers of this invention are prepared by reacting substantially equimolar quantities of sulfur dioxide with allyl epoxy alkane ethers in an inert solvent. Examples of the solvents that can be used are 1,1,1-trichloroethane, chloroform, carbon tetrachloride, perchloroethylene, benzene, ethyl alcohol, hexane, etc.

In general, the process involves saturating the solvent with sulfur dioxide in a reaction flask and then adding the allyl epoxy alkane ether dropwise over a period of time ranging from one minute to 72 hours in the presence of a catalytic agent.

The polymerization can be effected with the aid of a chemical catalyst. The chemical catalyst used herein comprise ionic type catalyst (such as silver nitrate, lithium nitrate and ammonium nitrate) and peroxide-type free radical catalyst (such as methylethylketone peroxide and t-butylperoxy pivalate). When an ionic type catalyst is used, it is used in an amount from about 0.001 to 3 percent by weight based on the weight of the unsaturated monomer present. Similarly, when a free-radical catalyst is used the amount needed varies from about 0.05 to 5.0 percent based on the weight of the unsaturated monomer.

The temperature of the polymerization reaction can vary from —50° C. to 50° C. with the range from 0° C. to 30° C. being preferred. Normally, sufficient pressure is maintained on the reaction mixture to keep the reactants in the liquid phase. However, the pressure can range from to to 100 pounds per square inch (gauge) (p.s.i.g.) with 1 to 20 p.s.i.g. being the preferred range. The molar ratio of the monomers can vary from 0.1 to 1 mole of sulfur dioxide to unsaturated monomer to 100:1 with a range from 1:1 to 10:1 being preferred.

The copolymer is insoluble in the inert solvents and is recovered as a fine powder by filtration followed by washing with the pure solvent. The copolymers of this invention have a molecular weight range from about $1 \times 10^4$ to about $1 \times 10^6$ and have about 3 weight percent to about 20 weight percent epoxy groups.

The allyl epoxy alkane ethers which are used in this invention are exemplified by allyl glycidyl ether, allyl 2,3-epoxy-2-methylpropyl ether, allyl 2,3-epoxy butyl ether, allyl 2,3-epoxy-2-methyl-butyl ether or mixtures thereof. These compounds are either commercially available or readily prepared by selective epoxidation of the corresponding diolefins.

The fabrics which can be treated and sized by the copolymers of this invention are those perpared from natural or synthetic fibers.

The amount of the copolymers which are added to the fabrics to achieve effective sizing is in the range from about 1 to 20 weight percent based on the weight of the fabric.

The natural fibers are those of the animal or vegetable type as exemplified by silk, wool, cotton, kapok, flax, hemp, and the like.

The synthetic fibers are exemplified by acetate, acrylic, nylon, polyester, rayon, triacetate and the like.

The fabrics made from the above fibers are preferably soaked in the above allyl ethers containing an effective amount of a catalyst and copolymerized in situ by treating the impregnated fabric with an atmosphere of sulfur dioxide for a period of from about 0.1 to 20 hours at a temperature ranging from about 0° C. to about 40° C. This technique provides a fabric with the copolymer mechanically locked into the pores and interstices of the fabrics and/or chemically reacted therewith by virtue of the epoxy groups and thus the fabrics are permanently sized.

Alternatively, the above copolymers can be dissolved in hot water i.e. a temperature range of from about 50 to 90° C. having a pH of from about 6 to about 8 to produce a solution into which the fibers can be dipped and dried at a temperature from about 20° to 120° C. to provide a permanent size.

The following examples are provided solely to illustrate and not limit the claimed invention.

Example 1

A 16 ounce wide mouth bottle was set up in the hood in a wet ice bath. The bottle was then charged with 100 mls. (1.15 moles) Chlorothene Nu, (a commercial solvent containing about 99.5% methyl chloroform and 0.5% dioxane) and was then saturated with $SO_2$ gas at 0.8 g./min. flow rate for a 30 minute period at 7° C. (to provide about 24 g. of 0.37 mole of $SO_2$) Allyl glycidyl ether (10 mls or 0.086 mole) was added dropwise to the $SO_2$ saturated solution over a 5-minute period. The instant each drop hit the Chlorothene Nu solution an insoluble polymer floc would form. After about 30 minutes reaction time, the flocs of polymer were filtered from the reaction medium using a #2 Whatman Paper. The polymer was washed 4 times using a total of 300 mls. of Chlorothene Nu. The polymer was then dried in a vacuum oven at 40° C. and 25 inches vacuum for a 5-hour period. The dried powder was essentially free of odor and was a hard, white solid, insoluble in common organic solvents. It decomposed upon melting at 230°-240° C. The infra-red spectrum indicated a polymer containing allyl glycidyl ether where there is no residual ethylenic unsaturation; $SO_2$ content estimated at 20-30% wt.; epoxide content was appreciable and was estimated at 6 to 10% wt.

Example 2

A 32 ounce widemouth bottle was set up in the hood in a cold water bath and was then charged with 700 mls. (8 moles) of Chlorothene Nu. Sulfur dioxide gas was added to the Chlorothene Nu via an inlet tube at a flow rate of about 3 g./min. for a 30 minute period (total $SO_2$ added was approximately 1.5 moles). The temperature rose to 20° C. At this time, 50 mls. (0.43 mole) of allyl glycidyl ether was added directly to the bottle contents. Within 10 seconds, white flaky polymer solids appeared. The solids settled to the bottom of the Chlorothene Nu and no exotherm was seen. The flocs were broken up with manual stirring and left to react at 15° C. with 20° C. for a total reaction period of 2 hrs. The polymer was filtered, washed and vacuum dried as described in Example 1. Yield of product was 39% based on a 1:1 mole ratio copolymer. Elemental analysis was as follows:

| Element | Percent by weight | |
|---|---|---|
| | Theory | Actual [1] |
| S | 19.5 | 15.0 |
| C | 36.6 | 36.2 |
| O | 39.0 | 30.3 |
| H | 4.9 | 18.5 |

[1] By difference.

The I-R. spectrum supported the presence of epoxide groups (est. 6-8% wt.); high amount of sulfone groups; and a moderate concentration of polyether groups. The spectrum was consistent with the expected structure of allyl glycidyl ether polysulfone.

This polymer became soft at 175°-185° C. and decomposed upon melting at 215°-225° C.

Example 3

When Examples 1 and 2 were repeated using freshly distilled allyl glycidyl ether, no polymer was formed. This is explained by the assumption that peroxides in the aged allyl glycidyl ether acted as a catalyst in Examples 1 and 2. In order to demonstrate this, a catalyst was used with freshly distilled allyl glycidyl ether to obtain substantially the same polymer as is illustrated below.

A three liter resin kettle was charged with 1000 mls. of Chlorothene Nu and this was saturated with sulfur dioxide at 8° C. as in Example 2 (giving about 2.0 moles of sulfur dioxide). Then, 100 grams (0.88 mole) of freshly distilled allyl glycidyl ether was added dropwise over a one-hour period with stirring. This was followed by 5 mls. of Lupersol 11 catalyst (75% t-butyl peroxy pivalate in mineral spirits) over a 15 second period with stirring and an $SO_2$ flow of 0.8 gram per minute. A soft, white polymer was formed having similar physical properties as that in Example 2.

By following the above example and using, in place of allyl glycidyl ether, allyl 2,3-epoxy-2-methyl-propyl ether, allyl 2,3-epoxy-butyl ether, allyl 2,3-epoxy-2-methyl-butyl ether or mixtures thereof, similar results are obtained.

Example 4

A 4 x 4 inch piece of cotton print cloth was dipped into a solution of 20 mls. of freshly distilled allyl glycidyl ether containing 0.5 ml. Lupersol 11 catalyst at 12° C. The cloth was then withdrawn and placed in a glass bottle purged with $SO_2$ gas at a rate of flow of 0.8 gram per minute and at a temperature of about 20° C. The $SO_2$ gas was continued for 20 hours to insure that complete polymerization took place. The cloth was rinsed in warm water to remove excess $SO_2$ and allyl glycidyl ether. The treated cloth wets with water rapidly and behaves as if untreated. When the treated cloth dries out, it is stiff, behaves like paper, and tends to retain its original shape.

Example 5

A 250 ml. beaker was charged with 5 gms. of the polymer prepared in Example 3 and 100 gms. of deionized distilled water which was heated to boiling. The pH of the allyl glycidyl ether polysulfone slurry was about 1 and this was reduced to about pH 8 by the addition of 1 cc. of concentrated ammonium. The slurry immediately turned water white except for some small lumps which dissolved in about 10 minutes. The solution when cold was a light yellow color with a pH of 6 and contained about 5% of solids.

The above solution was used to permanently size cellulosic fabrics in the following manner. A 2 x 2 inch square piece of non-woven cellulosic fabric was first weighted (0.257 gram) then dipped into 20 gms. of the above water solution. The fabric was then heated in an oven at 90° C. for one minute, cooled, and reweighted. The weight pickup was 0.003 gram or about 1.2% by weight.

The dry treated fabric was stiff and showed good size properties when folded. When the treated fabric was hand washed in 250 cc. deionized distilled water for 5 minutes, it was observed that the treated fabric behaved as if it were unsized. After drying at 90° C. for one minute and cooled, the washed fabric was still stiffer and sized more than untreated controls while the hand was similar to the controls. The washing procedure was again repeated with the same results.

We claim:

1. An article of manufacture comprising natural or synthetic fabrics having contained therein an effective sizing amount of copolymers of sulfur dioxide with a member of the group consisting of
(a) a compound of the formula

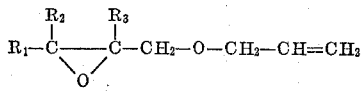

where $R_1$, $R_2$ and $R_3$ are independently hydrogen or methyl groups and
(b) mixtures of the foregoing.

2. An article of manufacture as set forth in claim 1 wherein the fabric contains a compound of the formula

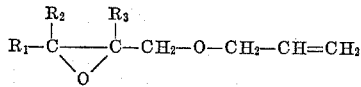

where $R_1$, $R_2$ and $R_3$ are independently hydrogen or methyl groups.

3. An article of manufacture as set forth in claim 2 wherein $R_1$, $R_2$ and $R_3$ are hydrogen.

References Cited

UNITED STATES PATENTS

| | | | |
|---|---|---|---|
| 2,953,550 | 9/1960 | Frostick et al. | 112—139.5 A |
| 3,657,200 | 4/1972 | Moore et al. | 117—139.5 A |

WILLIAM D. MARTIN, Primary Examiner

T. G. DAVIS, Assistant Examiner

U.S. Cl. X.R.

117—138.8 F, 138.8 N, 138.8 UA, 140 A, 141, 142, 143 A, 145

PO-1050
(5/69)

UNITED STATES PATENT OFFICE
CERTIFICATE OF CORRECTION

Patent No. 3,725,125          Dated April 3, 1973

Inventor(s) William Ross Moore and Ralph Rolland Langner

It is certified that error appears in the above-identified patent and that said Letters Patent are hereby corrected as shown below:

Column 2, line 29, delete "to" , 1st occ., and insert -- 1 -- .

Column 2, line 49, change "perpared" to prepared.

Column 3, line 50, delete "with" and insert -- to --.

Column 4, line 49, change "ammonium" to -- ammonia --.

Signed and sealed this 29th day of October 1974.

(SEAL)
Attest:

McCOY M. GIBSON JR.          C. MARSHALL DANN
Attesting Officer          Commissioner of Patents